(12) United States Patent
Chapman

(10) Patent No.: US 12,420,578 B2
(45) Date of Patent: Sep. 23, 2025

(54) GLOSS EFFECT

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 153 days.

(21) Appl. No.: 18/382,498

(22) Filed: Oct. 21, 2023

(65) Prior Publication Data

US 2025/0128532 A1 Apr. 24, 2025

(51) Int. Cl.
| | |
|---|---|
| B41M 3/00 | (2006.01) |
| B41J 29/393 | (2006.01) |
| B41M 3/10 | (2006.01) |
| H04N 1/32 | (2006.01) |

(52) U.S. Cl.
CPC ............ *B41M 3/008* (2013.01); *B41J 29/393* (2013.01); *H04N 1/32309* (2013.01); *H04N 1/32347* (2013.01); *H04N 1/32352* (2013.01); *B41M 3/10* (2013.01); *B41M 2205/16* (2013.01); *B41M 2205/42* (2013.01)

(58) Field of Classification Search
CPC .... B41M 3/008; B41M 3/10; B41M 2205/16; B41M 2205/42; B41J 29/393; H04N 1/32309; H04N 1/32347; H04N 1/32352
See application file for complete search history.

(56) References Cited

U.S. PATENT DOCUMENTS

| | | | |
|---|---|---|---|
| 9,118,870 B2 | 8/2015 | Chapman | |
| 9,237,253 B2 | 1/2016 | Chapman et al. | |
| 9,444,969 B2 | 9/2016 | Miller et al. | |
| 9,614,995 B1 | 4/2017 | Chapman | |
| 9,781,294 B1 | 10/2017 | Chapman | |
| 10,580,103 B1 * | 3/2020 | Falkenstern | ............ G06T 1/005 |
| 10,686,963 B1 * | 6/2020 | Rodriguez | ......... H04N 1/32336 |
| 10,783,601 B1 * | 9/2020 | Rodriguez | ............ G06T 1/0028 |
| 11,900,497 B1 * | 2/2024 | Falkenstern | ............. B41M 3/10 |
| 2009/0238616 A1 | 9/2009 | Ciaschi | |

(Continued)

FOREIGN PATENT DOCUMENTS

| | | |
|---|---|---|
| EP | 1705529 A1 | 9/2009 |
| EP | 2230088 B1 | 5/2012 |

(Continued)

*Primary Examiner* — Nicholas Pachol
(74) *Attorney, Agent, or Firm* — KPPB Law; Kermit D. Lopez; Luis M. Ortiz

(57) ABSTRACT

Methods and systems for creating a gloss effect, can involve adjusting a color selected with a first RGB color value for a first pattern ink among a group of pattern inks to appear lighter and selecting a common geometric pattern for the group of pattern inks including the first pattern ink and a second pattern ink. A feature can be written with an object with a second RGB color value and a geometric pattern can be written opaquely on top of the selected common geometric pattern. The feature can be erased within the object with a third RGB color value. The feature can be then written with a fourth RGB color value. The geometric pattern can be then written opaquely on top of the feature in the color adjusted selected for the first pattern ink to create a gloss effect with the geometric pattern opaquely on top of the feature in the color adjusted selected for the first pattern ink which displays the feature.

20 Claims, 8 Drawing Sheets

(56) References Cited

U.S. PATENT DOCUMENTS

| | | | | |
|---|---|---|---|---|
| 2015/0077803 A1* | 3/2015 | Chapman | ............. | H04N 1/3232 |
| | | | | 428/201 |
| 2015/0077804 A1* | 3/2015 | Chapman | ................ | H04N 1/40 |
| | | | | 358/3.01 |
| 2015/0077805 A1* | 3/2015 | Miller | ..................... | H04N 1/60 |
| | | | | 358/3.01 |
| 2015/0077806 A1* | 3/2015 | Miller | ................ | H04N 1/32352 |
| | | | | 358/3.01 |
| 2015/0077807 A1* | 3/2015 | Chapman | ................ | H04N 1/60 |
| | | | | 358/3.01 |
| 2015/0079357 A1* | 3/2015 | Chapman | ........... | H04N 1/00867 |
| | | | | 347/110 |
| 2015/0269703 A1* | 9/2015 | Chapman | ........... | H04N 1/32208 |
| | | | | 358/3.28 |
| 2017/0150000 A1* | 5/2017 | Chapman | ........... | H04N 1/32309 |
| 2022/0385783 A1* | 12/2022 | Brundage | ............... | G06T 1/005 |

FOREIGN PATENT DOCUMENTS

| | | |
|---|---|---|
| WO | 2006099897 A1 | 9/2006 |
| WO | 2009085130 A1 | 8/2009 |

* cited by examiner

GLOSS EFFECT

TECHNICAL FIELD

Embodiments are related to image processing methods, systems and devices. Embodiments also relate to the field of specialty imaging techniques. Embodiments further relate to the creation and rendering of specialty effects, which may be incorporated into rendered documents. Embodiments further relate to improved gloss effects.

BACKGROUND

Specialty imaging techniques are a set of advanced and specialized methods used in printing applications, including the incorporation of digital watermarks. These techniques are designed to enhance the security and authenticity of printed documents, such as banknotes, passports, ID cards, and other sensitive materials, by making them difficult to counterfeit or reproduce accurately. These specialty imaging techniques can also be utilized in non-security applications such as incorporating special effects into, for example, greeting cards and advertising materials.

Specialty imaging is useful for the creation of digital watermarks, which are embedded patterns or information within a printed image that are typically imperceptible to the human eye but can be detected using specialized equipment or software. Digital watermarks (sometimes referred to simply as a 'watermark' or 'watermarks') can serve as a means of authentication and can contain information such as the document's origin, serial number, or security features.

Digital watermarks may be visible or invisible. Visible watermarks are discernible by the naked eye and may include text or patterns that are difficult to replicate accurately. Invisible watermarks are hidden within the document's content and require specialized tools for detection. Watermarks can be robust, meaning they remain detectable even after various printing and scanning processes, or fragile, meaning they are easily damaged if the document is tampered with.

Gloss marks are a type of watermark used in the field of security printing and document authentication. Unlike traditional watermarks, which are typically created by altering the thickness or density of paper during the manufacturing process, gloss marks are created by manipulating the surface finish of the paper or substrate. These marks are often used to enhance the security and authenticity of documents, such as banknotes, passports, certificates, and important identification papers.

Gloss marks may be produced by varying the surface finish of the paper or substrate. This is typically achieved by applying a clear or translucent coating to specific areas of the document during the printing process. This coating can be either more reflective (glossy) or less reflective (matte) than the surrounding surface.

Watermarks are usually invisible or extremely difficult to detect without the aid of specialized equipment or lighting conditions. This makes them a valuable security feature, as counterfeiters are less likely to replicate something they cannot see easily.

To reveal watermarks, inspectors or document verifiers can use specific lighting techniques. For example, ultraviolet (UV) or infrared (IR) light sources can be used to illuminate the document. The gloss marks may become visible under these lighting conditions due to their different reflectivity or fluorescence properties compared to the rest of the document.

Gloss marks can be designed in intricate patterns, logos, or text, making them unique to a particular organization, document type, or denomination (in the case of banknotes). These complex designs are difficult to reproduce accurately, further enhancing security.

Gloss marks can serve as a powerful anti-counterfeiting measure because they are challenging for counterfeiters to replicate accurately. Attempting to reproduce the surface finish variation and patterns requires advanced printing technology and expertise.

Many documents incorporate multiple layers of security features, including traditional watermarks, security threads, holograms, and gloss marks, to provide a multi-level approach to document authentication. Gloss marks can also be used to detect tampering or alterations. If someone tries to alter a document by removing or modifying the gloss mark, it will be evident under proper inspection.

Gloss Marks are a form of holographic watermark that do not require special materials. Although they were once widely popular, their usage has decreased over time due to compatibility issues with emulsion aggregation (EA) toner. It's worth noting that Gloss Marks have historically performed better on production devices and systems compared to multifunction devices like those used in Discovery/Office settings.

FIG. 1 illustrates an image 10 of a prior art gloss mark rendered on a document. This Gloss Mark™ is exemplified in FIG. 1 by the presence of the text "BOWER CUP" in the image 10 The unique characteristic of this mark is its ability to become visible or invisible depending on the angles of light and the observer's perspective. This feature has contributed to the mark's popularity, as it eliminates the need for specialized tools such as UV light or magnification for deciphering. Instead, this mark can be conveniently printed using standard media and toners, avoiding the necessity for expensive or proprietary materials.

While gloss marks such as shown in FIG. 1 can enhance the visual appeal and impact of printed materials, there are limitations associated with their use, particularly in relation to the types of printers they are compatible with. One significant limitation is that Gloss Marks often only work effectively on a few very high-end printers, such as, for example, the iGen without low gloss toner and the DC8000.

Gloss Marks require specialized printing technology that is not commonly found in all types of printers. High-end printers, like the iGen and DC8000, are equipped with the necessary capabilities to apply spot gloss finishes accurately and consistently. They often have advanced print heads and toner delivery systems designed for this purpose.

Applying Gloss Marks requires precise registration of the glossy layer with the printed content. High-end printers are equipped with advanced registration mechanisms that can ensure accurate alignment, which is crucial to achieving the desired effect. Lower-end or standard printers may lack this level of precision.

Many high-end printers designed for Gloss Marks use a specific type of toner, often referred to as low gloss toner. This toner is formulated to provide a smooth and reflective surface, which is essential for creating the glossy finish. Not all printers support or can effectively use this specialized toner.

Some high-end printers, like the iGen, are capable of variable data printing, which means they can apply Gloss Marks to different areas of each printed piece based on individualized data. This feature is particularly useful for personalized marketing materials. Lower-end printers may not have this capability.

High-end printers with Gloss Marks capabilities tend to be expensive to purchase and maintain. The specialized toner and consumables required for this printing technique can also add to the overall cost. This cost factor can be a significant limitation for smaller businesses or organizations with budget constraints.

Due to the specialized nature of Gloss Marks printing, not all printing service providers have access to or invest in high-end printers capable of producing Gloss Marks effectively. This limited availability can be a constraint for customers seeking this specific finishing option.

FIG. 2 depicts an image 20 of the zoomed in character "H". The background character box surrounding the H has dots in one direction while the foreground "H" has dots in another direction. FIG. 3 shows a Gloss Mark composed of vector patterns that express the letters "A B C D E". FIG. 4 illustrates an image of a "usable" or "working" gloss effect, which produces a weaker effect than found on production devices but which is not sufficient with EA toner. The letters "A B C" can be seen in the left section 42, the middle section 44, and the left section 40 of the Gloss Mark depicting in FIG. 4. FIG. 5 an image of a prior art gloss effect, which can be referred to as "MicroGloss" and which can be limited to small sizes.

To address the issues noted above, the present inventor proposes an improved gloss effect for use in security printing applications, which is discussed in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for improved methods and systems for rendering an improved watermark for use in printing applications including security and non-security type applications.

It is a further aspect of the embodiments to provide for methods and systems for creating and rendering an improved gloss effect.

The aforementioned aspects and other objectives and advantages can now be achieved as described herein. In an embodiment, a method for creating a gloss effect can involve: adjusting a color selected with a first RGB color value for a first pattern ink among a plurality of pattern inks to appear lighter; selecting a common geometric pattern for the plurality of pattern inks including the first pattern ink and a second pattern ink among the plurality of pattern inks; writing a feature within an object with a second RGB color value; writing a geometric pattern opaquely on top of the selected common geometric pattern; erasing the feature within the object with a third RGB color value; writing the feature with a fourth RGB color value; and writing the geometric pattern opaquely on top of the feature in the color adjusted selected for the first pattern ink to create a gloss effect with the geometric pattern opaquely on top of the feature in the color adjusted selected for the first pattern ink which displays the feature.

An embodiment can further involve transmitting the gloss effect to a printing system for printing of a watermark on a recording medium with the gloss effect.

An embodiment can further involve rendering the gloss effect on a recording medium.

In an embodiment, the recording medium can comprise glossy media or non-glossy media.

In an embodiment the feature can comprise text and the object can comprise a textbox.

In an embodiment, the second RGB color value can be a lighter version of the first RGB color value, the third RGB color value can be near white, and the fourth RGB color value can be near yellow.

In an embodiment, the lighter version of the first RGB color value may be closer to white.

In an embodiment, a method for creating a gloss effect can involve: adjusting a color selected for a first pattern ink among a plurality of pattern inks to appear lighter; selecting a common geometric pattern for the plurality of pattern inks including the first pattern ink and a second pattern ink among the plurality of pattern inks; writing a feature within an object; writing a geometric pattern opaquely on top of the selected common geometric pattern; and writing the geometric pattern opaquely on top of the feature in the color adjusted selected for the first pattern ink to create a gloss effect with the geometric pattern opaquely on top of the feature in the color adjusted selected for the first pattern ink which displays the feature.

An embodiment can also involve erasing the feature within the object after writing the geometric pattern opaquely on top of the selected common geometric pattern.

In an embodiment, the step of adjusting a color selected for a first pattern ink among a plurality of pattern inks to appear lighter, can further involve adjusting the color selected with a first RGB for the first pattern ink among the plurality of pattern inks to appear lighter and the step of writing a feature within an object can further involve writing the feature within the object with a second RGB color value.

An embodiment may also involve erasing the feature within the object with a third RGB color value and writing the feature with a fourth RGB color value.

In an embodiment, a system for rendering a gloss effect, can include a memory, a storage medium for storing data, and a processor in communication with the storage medium and the memory, the processor executing machine readable instructions for: adjusting a color selected with a first RGB color value for a first pattern ink among a plurality of pattern inks to appear lighter; selecting a common geometric pattern for the plurality of pattern inks including the first pattern ink and a second pattern ink among the plurality of pattern inks; writing a feature within an object with a second RGB color value; writing a geometric pattern opaquely on top of the selected common geometric pattern; erasing the feature within the object with a third RGB color value; writing the feature with a fourth RGB color value; and writing the geometric pattern opaquely on top of the feature in the color adjusted selected for the first pattern ink to create a gloss effect with the geometric pattern opaquely on top of the feature in the color adjusted selected for the first pattern ink which displays the feature.

In an embodiment, the processor can be further configured to execute machine readable instructions for transmitting the gloss effect to a printing system for printing of a watermark on the recording medium with the gloss effect.

In an embodiment, the processor can be further configured to execute machine readable instructions for rendering the gloss effect on the recording medium.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Figure 1:
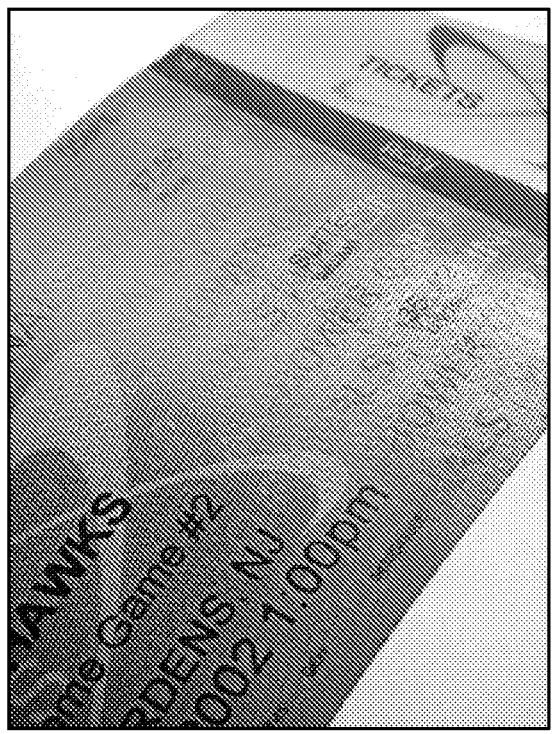
FIG. 1 illustrates an image of a prior art gloss mark rendered on a document.
Figure 2:
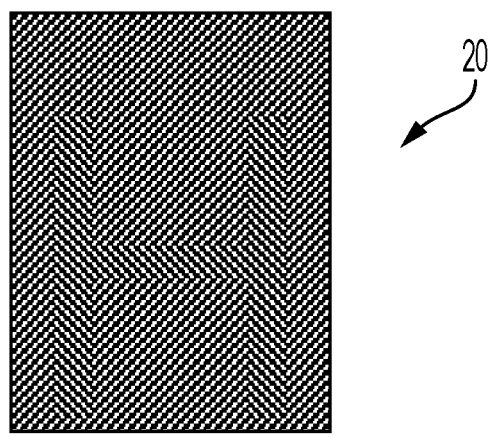
FIG. 2 illustrates an image of a zoomed original Gloss Mark™ font letter "H"
Figure 3:
FIG. 3 illustrates an image of zoomed "ABCDE" Gloss Mark™ vector pattern inks.
Figure 4:
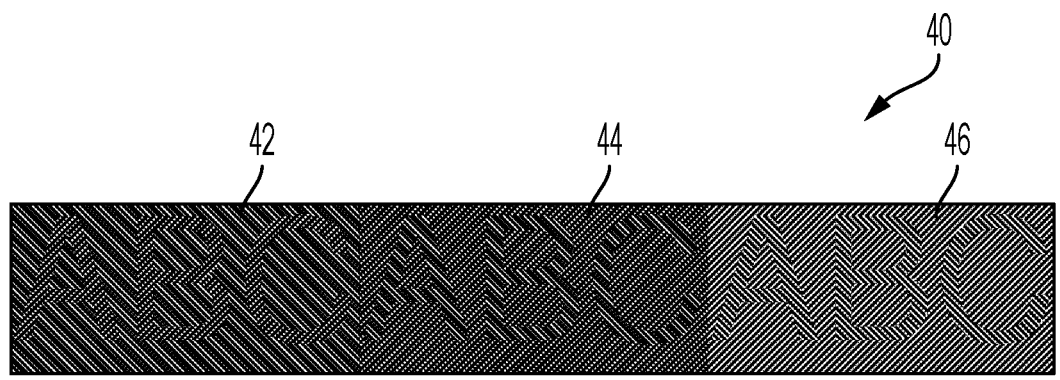
FIG. 4 illustrates an image of a gloss effect.
Figure 5:
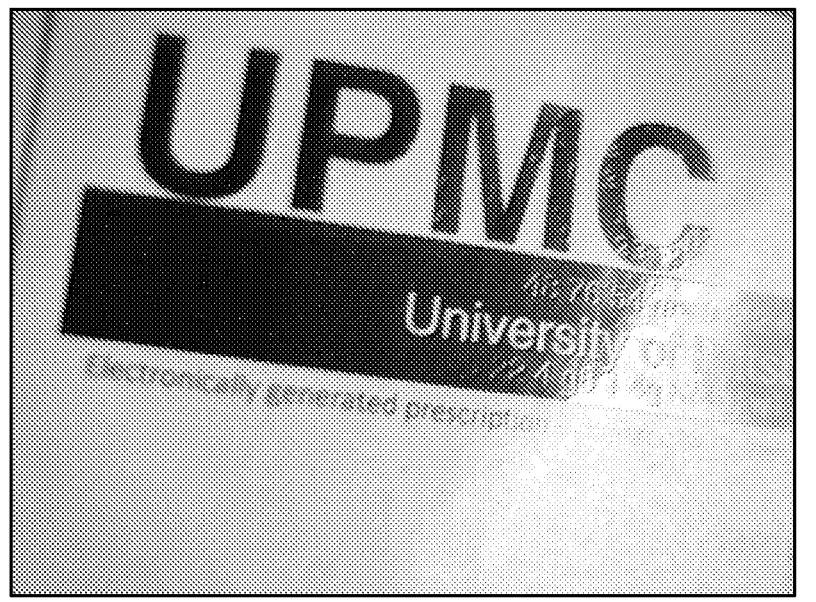
FIG. 5 illustrates an image a gloss effect referred to as MicroGloss.

It is important to note that while the drawings and figures presented herein are illustrated in black and white, they might have originally been created and displayed in color. As a result, those skilled in the art will understand that even though the images and figures may not display color, they may actually depict features in color.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "metameric" as utilized herein can relate to a metameric pair of pattern ink. In a metameric pair of pattern ink (also referred to simply as a "metameric pair") the printing and paper are not visually distinguishable when viewed from one angle but are from another angle (relative to a light source) which can create a watermark without more expensive spot inks, toners, and/or printers.

The term L*a*b (also referred to as Lab or LAB) as utilized herein relates to the CIELAB color space (L*a*b), which is a color space defined by the International Commission on Illumination (CIE). L*a*b It expresses color as three values: L*for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

Figure 6:
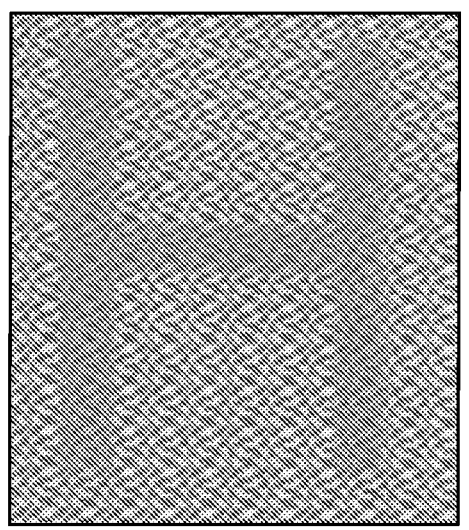
FIG. 6 illustrates an image of a zoomed GlossMark, in accordance with an embodiment.

The following method can be implemented, in accordance with an embodiment:
1) Select a color for pattern ink 1 (e.g., RGB 50 117 82)
2) Adjust the color from step 1 to appear lighter (e.g., RGB 79 160 6) and be the color for pattern ink 2
3) Select a common geometric pattern for both pattern inks (e.g., small rectangles found in both pattern inks)
4) Write a section or object (e.g., textbox in e.g., RGB 207 255 241 (near white))
5) Write the geometric pattern from step 3 opaquely on the section or object just written in step 4's almost white with the color of step 1
6) Erase the features (e.g., text) inside the textbox with pure white
7) Write the text with e.g., RGB 175 251 91 (near yellow)
8) Write the geometric pattern opaquely on top of the text in the color from step 2
9) Print on glossy media FIG. 6 illustrates an image 60 of a zoomed GlossMark, in accordance with an embodiment. The letter or text "H" is shown in the image 60 in FIG. 6 and is located within a textbox. The output color of step 1 is the non-whiteish color in the textbox. The output color of step 2 is the non-yellowish color in the text. It is derived from the color in step 1 by gradually lightning it in s swatch sheet. The geometric pattern common to both the textbox and the text from step 3 is the wavy lines. The output color of step 4 is the whiteish color in the textbox and the output color of step 7 is the yellowish color of the text. At printed sizes the colors in steps 1 and 4 appear around the same as the colors in steps 2 and 7 similar is the way halftones work. The common geometric symbol helps in hiding the watermark at some angles. Note that the step 9 (print on glossy media) is not required but can be implemented to improve the gloss effect. That is, other types of media (e.g., non-gloss media) may be utilized instead.

Figure 7:
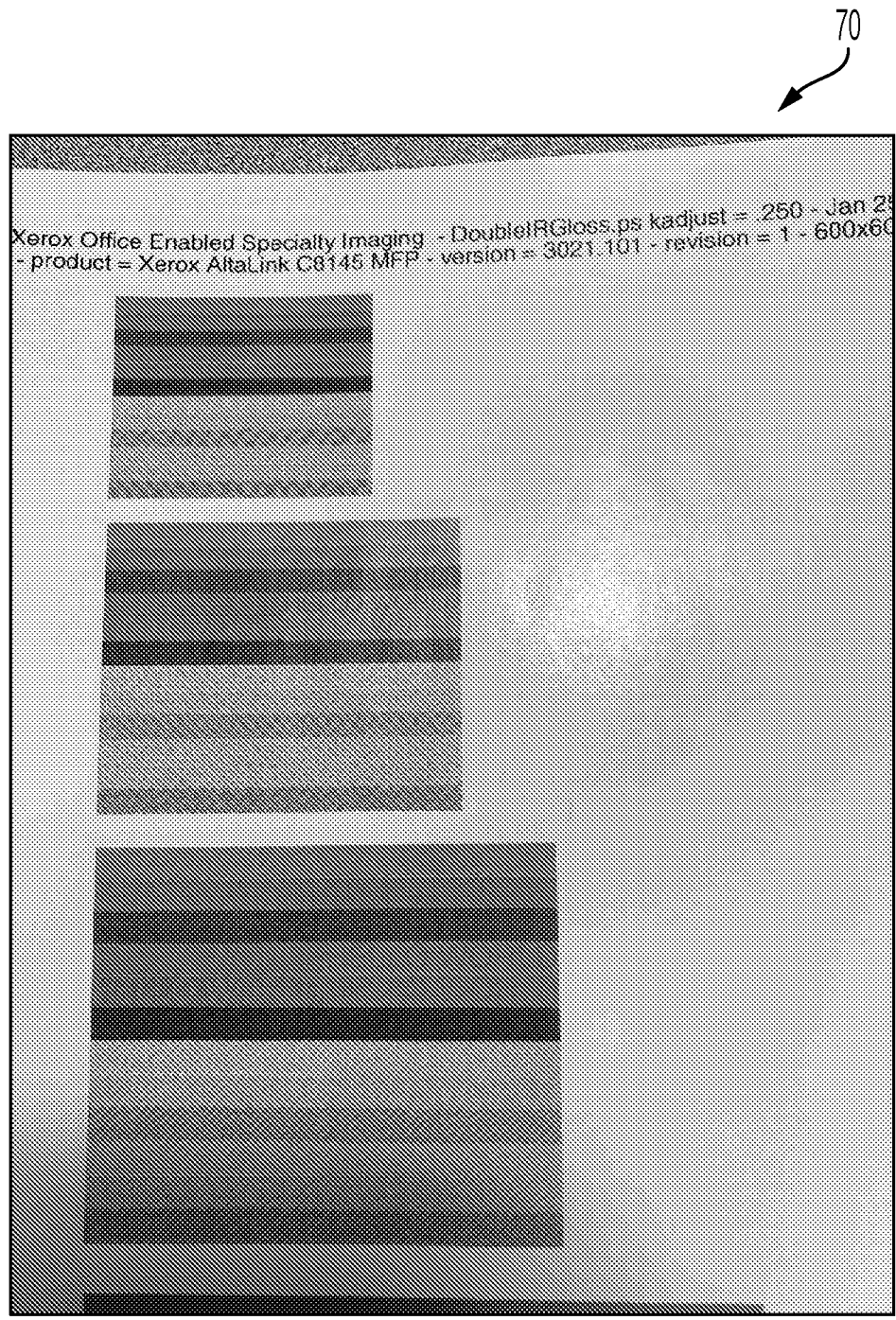
FIG. 7 illustrates an image of a swatch sheet at a first angle, in accordance with an embodiment.
Figure 8:
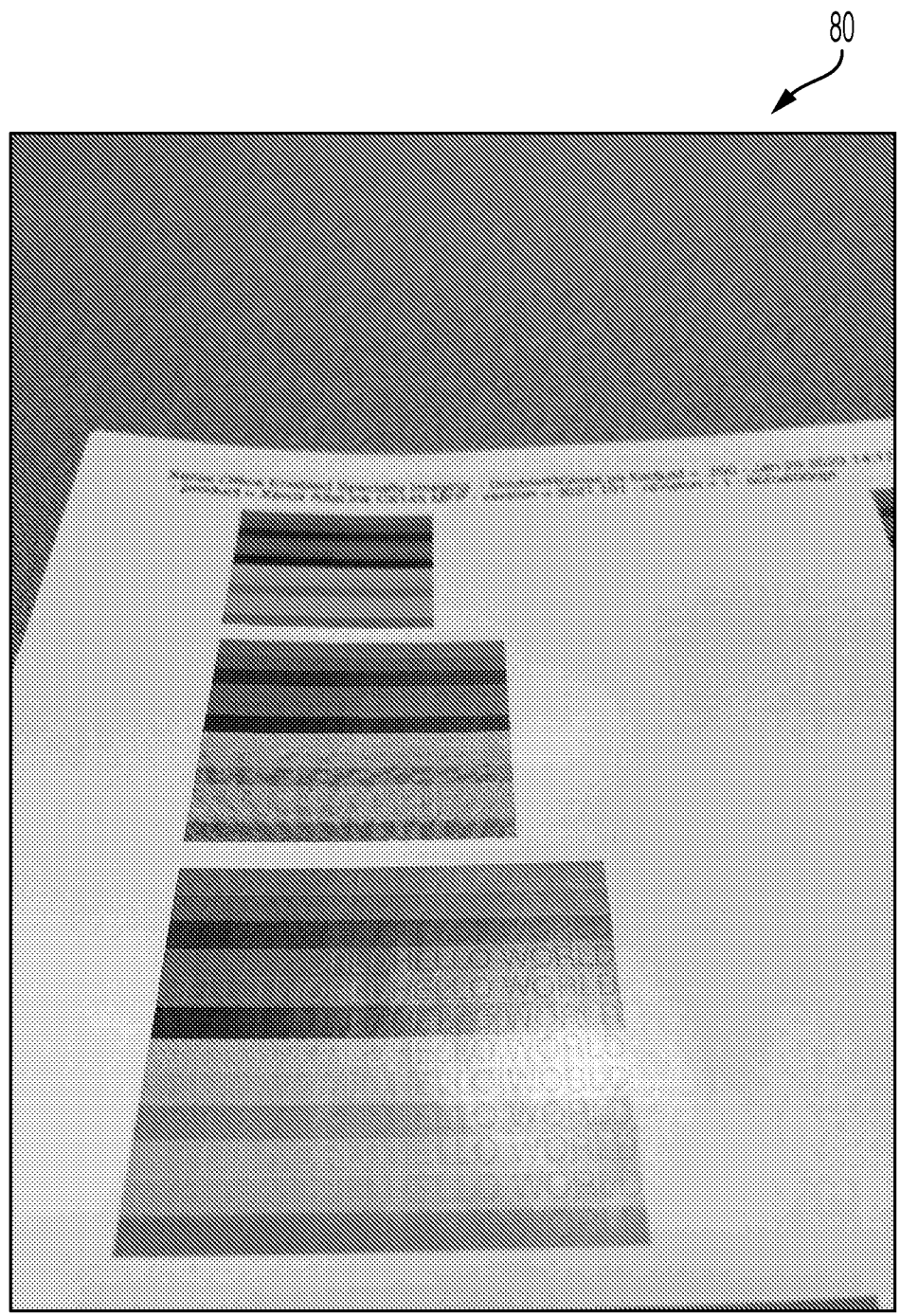
FIG. 8 illustrates an image of a swatch sheet at a second angle, in accordance with an embodiment.

FIG. 7 illustrates an image 70 of a swatch sheet at a first angle, in accordance with an embodiment. FIG. 8 illustrates an image 80 of a swatch sheet at a second angle, in accordance with an embodiment. The images shown in FIGS. 7-8 are of the same sheet of media at two angles. To be considered "working" it must be mostly invisible at one angle and visible at another. The 4th magenta patch down in the group near the bottom clearly shows it is working. Note that the patch above the working patch that is readable at both angles would be considered 'non-working'.

Figure 9:
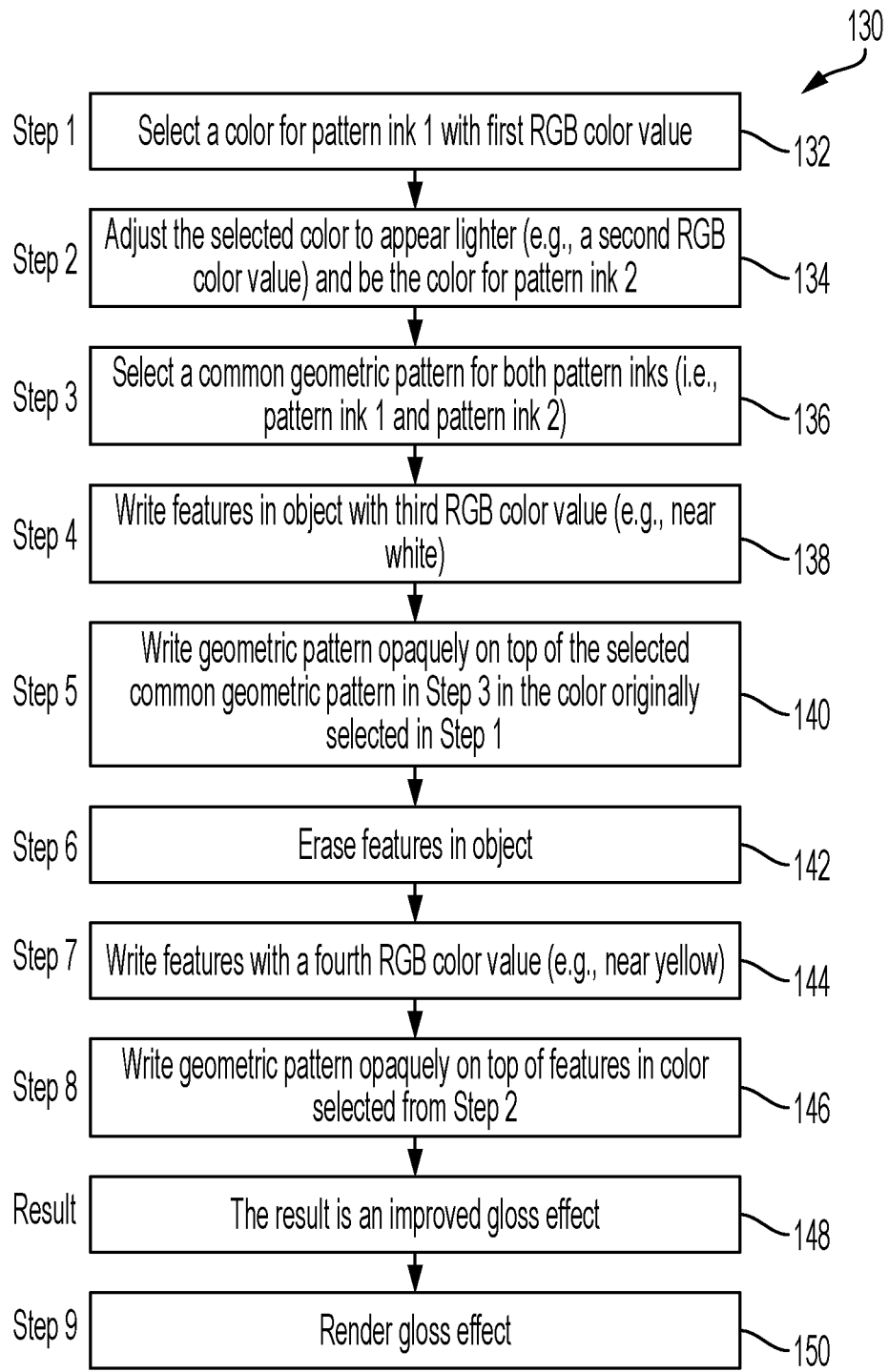
FIG. 9 illustrates a high-level flow chart of operations depicting a method for creating a gloss effect, in accordance with an embodiment.

FIG. 9 illustrates a high-level flow chart of operations depicting a method 130 for creating a gloss effect, in accordance with an embodiment. As shown at block 132, a step or operation can be implemented to select for a first pattern ink a first RGB color value (e.g., 50 117 82). Thereafter, as depicted at block 134, a step or operation can be implemented to adjust the color selected from step 1 (i.e., block 132) to appear lighter (e.g., RGB 79 160 6), which constitutes a second RGB color value. Next, as shown at block 136, a step or operation can be implemented to select a common geometric pattern for both pattern inks (e.g., pattern ink 1 and pattern ink 2). Then, as illustrated at block 138, a step or operation can be implemented to write features (e.g., text) in an object (e.g., a textbox) in a third RGB color value (e.g., RGB 207 255 241 (near white)).

Thereafter, as shown at block 140, a step or operation can be implemented to write the geometric pattern opaquely on top of step 3 in the color selected in step 1 (i.e., see the operation shown at block 130). Following processing of the step/operation shown at block 142, a step or operation can be implemented to erase features in the object with pure white. For example, this operation may involve erasing the text inside a textbox with pure white. Next, as shown at block 144, a step or operation can be implemented to write features with a fourth RGB color value. For example, the text can be written with RGB 175 251 91 (near yellow). Note that in some embodiments, the second RGB color value may be a lighter (closer to white) version of the first RGB color value and the third RGB color value may be near white.

As indicated thereafter at block 146, a step or operation can be implemented to write the geometric pattern opaquely on top of the features (e.g., text) in the color that was adjusted in step 2 (i.e., see the operation depicted at block 134). As depicted next at block 148, as a result of processing/implementing the steps/operations shown at blocks 130 to block 146, a gloss effect can be created, which can be rendered as or with a watermark as shown at block 149. The rendering operation shown at block 149 can involve, for example, rendering (printing) the gloss effect as a watermark on a recording medium such as, for example, glossy media.

Figure 10:
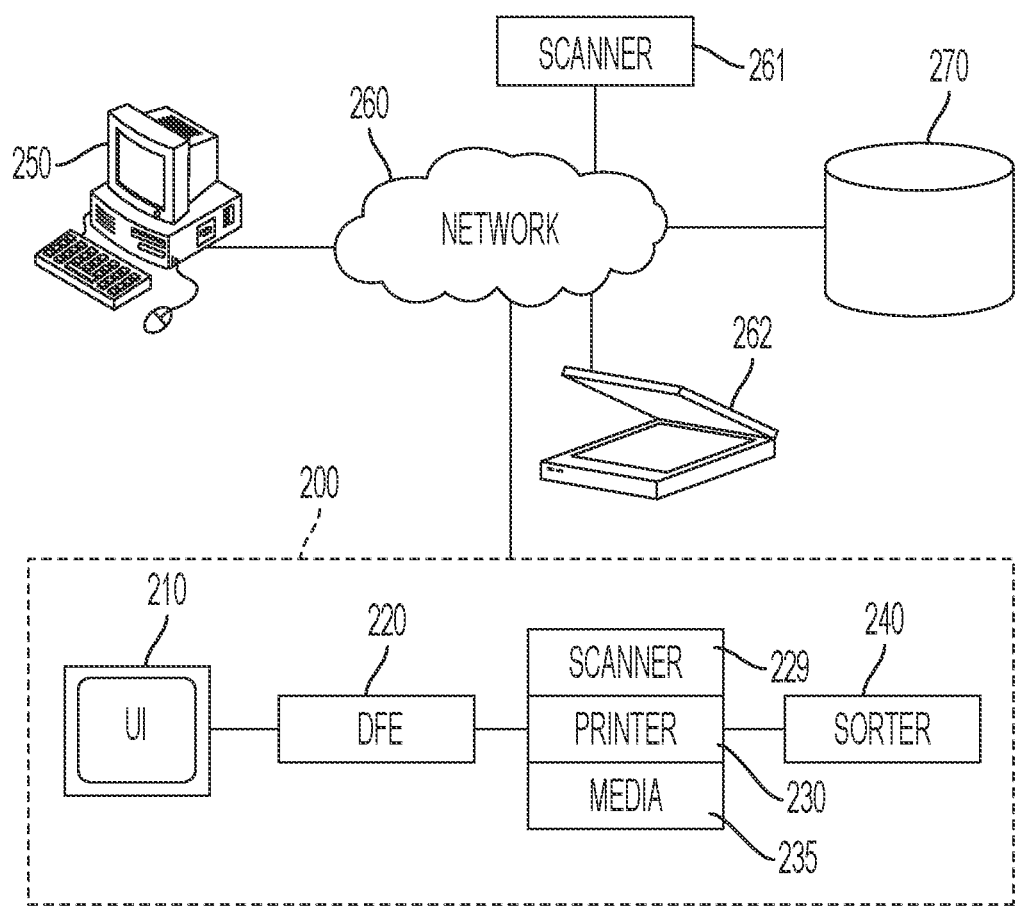
FIG. 10 illustrates a block diagram of a printing system suitable for implementing one or more of the disclosed embodiments.

FIG. 10 illustrates a block diagram of a printing system 200 suitable for implementing one or more of the disclosed embodiments. FIG. 12 illustrates a block diagram of a digital front-end controller 300 useful for implementing one or more of the disclosed embodiments. For example, the printing system 200 and/or the digital front-end controller 300 can be used to render a document with a yellow, black gloss effect.

With reference to FIG. 10, a printing system (or image rendering system) 200 suitable for implementing various aspects of the exemplary embodiments described herein is illustrated. The printing system 200 can implement rendering operations such as scanning a document via a scanner and printing a document via a printer, wherein the document exhibits the disclosed yellow, black gloss effect.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 10. For example, the scanner 229 is shown in FIG. 10 as a part of the printing system 200. Alternatively, or in addition to the scanner 229 included as a part of the printing system 100, a scanner may be implemented as a separate scanner 262 also depicted in FIG. 10, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, a digital front-end (DFE) controller 220, and at least one print engine 230. The print engine 230 has access to print media 235 of various sizes and cost for a print job. The printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path, as known in the art.

Figure 11:
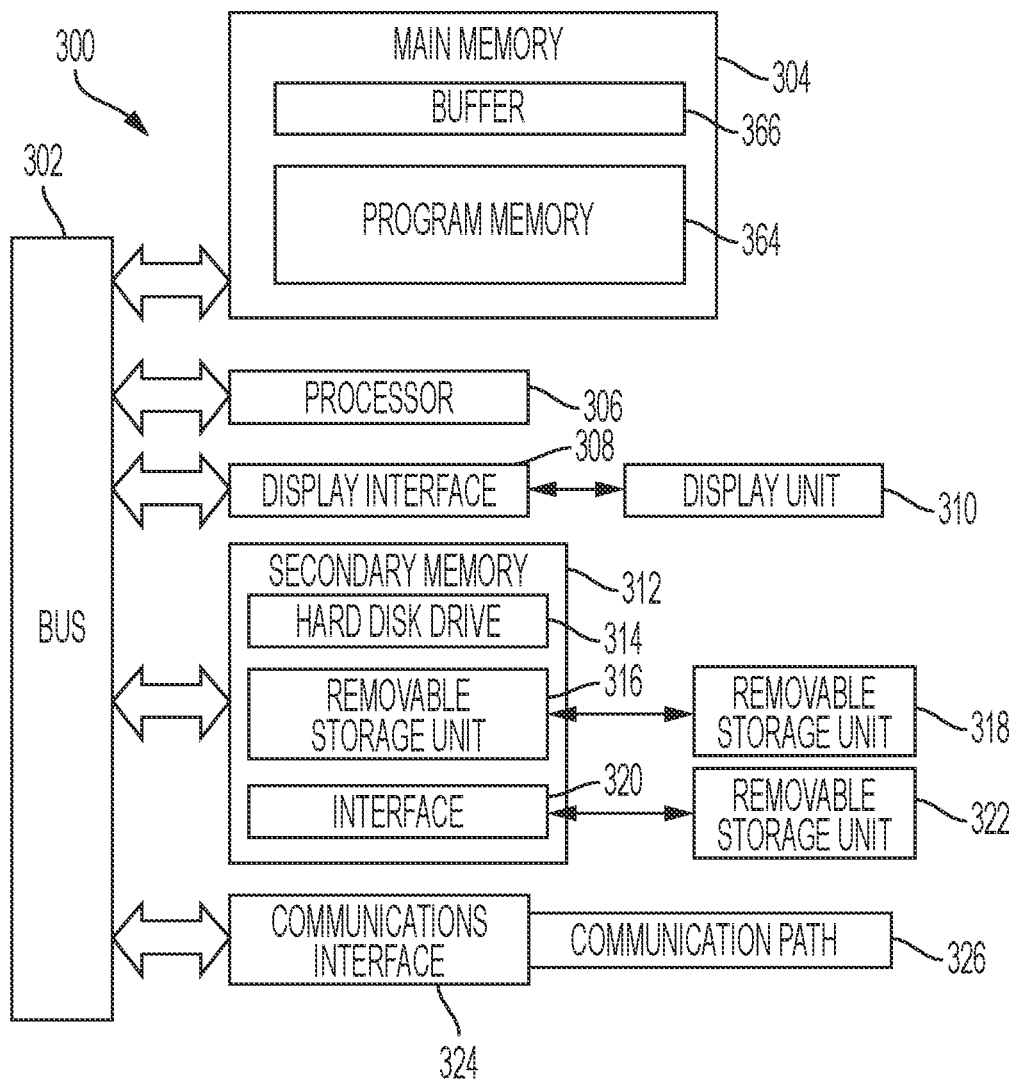
FIG. 11 illustrates a block diagram of a digital front-end controller useful for implementing one or more of the disclosed embodiments.

With respect to FIG. 11, an exemplary DFE (Digital Front End) controller 300 is shown in greater detail. The DFE controller 300 can include one or more processors, such as processor 306 capable of executing machine executable program instructions. The processor 306 can function as a DFE processor.

In the embodiment shown in FIG. 11, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 shown in FIG. 11 can include a communications interface 324, which can act as an input and an output to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 11 and/or the DFE controller 300 shown in FIG. 12. A "module" can perform the various steps, operations or instructions discussed herein, such as one or more of the steps or operations discussed herein.

The methods described herein, for example, may be implemented, in part, in a computer program product comprising a module that may be executed by, for example, DFE controller 220. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 10).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which the security device (e.g., a watermark) may be rendered.

Based on the foregoing, it can be appreciated that a number of different embodiments, including preferred and alternative embodiments, are disclosed herein. For example, in an embodiment, a method for creating a gloss effect, can involve: adjusting a color selected with a first RGB color value for a first pattern ink among a plurality of pattern inks to appear lighter; selecting a common geometric pattern for the plurality of pattern inks including the first pattern ink and a second pattern ink among the plurality of pattern inks; writing a feature within an object with a second RGB color value; writing a geometric pattern opaquely on top of the selected common geometric pattern; erasing the feature within the object with a third RGB color value; writing the feature with a fourth RGB color value; and writing the geometric pattern opaquely on top of the feature in the color adjusted selected for the first pattern ink to create a gloss effect with the geometric pattern opaquely on top of the feature in the color adjusted selected for the first pattern ink which displays the feature.

An embodiment can further involve transmitting the gloss effect to a printing system for printing of a watermark on a recording medium with the gloss effect.

An embodiment can further involve rendering the gloss effect on a recording medium.

In an embodiment, the recording medium can comprise glossy media.

In an embodiment, the recording medium can comprise non-glossy media.

In an embodiment, the feature can comprise text and the object can comprise a textbox.

In an embodiment, the second RGB color value can be a lighter version of the first RGB color value, the third RGB color value can be near white, and the fourth RGB color value can be near yellow.

In an embodiment, the lighter version of the first RGB color value can be closer to white.

In an embodiment, a method for creating a gloss effect, can involve: adjusting a color selected for a first pattern ink among a plurality of pattern inks to appear lighter; selecting a common geometric pattern for the plurality of pattern inks including the first pattern ink and a second pattern ink among the plurality of pattern inks; writing a feature within an object; writing a geometric pattern opaquely on top of the selected common geometric pattern; and writing the geometric pattern opaquely on top of the feature in the color adjusted selected for the first pattern ink to create a gloss effect with the geometric pattern opaquely on top of the feature in the color adjusted selected for the first pattern ink which displays the feature.

An embodiment can further involve erasing the feature within the object after writing the geometric pattern opaquely on top of the selected common geometric pattern.

An embodiment can further involve adjusting a color selected for a first pattern ink among a plurality of pattern inks to appear lighter, further comprises: adjusting the color selected with a first RGB for the first pattern ink among the plurality of pattern inks to appear lighter; and writing a feature within an object, further comprises: writing the feature within the object with a second RGB color value.

An embodiment can further involve erasing the feature within the object with a third RGB color value; and writing the feature with a fourth RGB color value.

In an embodiment, a system for rendering a gloss effect, can include: a memory (e.g., a main memory 304, a secondary memory 312); a storage medium (e.g., database 270) for storing data; and a processor (e.g., processor 306) in communication with the storage medium and the memory. The processor can execute machine readable instructions for: adjusting a color selected with a first RGB color value for a first pattern ink among a plurality of pattern inks to appear lighter; selecting a common geometric pattern for the plurality of pattern inks including the first pattern ink and a second pattern ink among the plurality of pattern inks; writing a feature within an object with a second RGB color value; writing a geometric pattern opaquely on top of the selected common geometric pattern; erasing the feature within the object with a third RGB color value; writing the feature with a fourth RGB color value; and writing the geometric pattern opaquely on top of the feature in the color adjusted selected for the first pattern ink to create a gloss effect with the geometric pattern opaquely on top of the feature in the color adjusted selected for the first pattern ink which displays the feature.

In an embodiment, the processor can further execute machine readable instructions for transmitting the gloss effect to a printing system for printing of a watermark on the recording medium with the gloss effect.

In an embodiment, the processor can further execute machine readable instructions for rendering the gloss effect on the recording medium.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for creating a gloss effect, comprising:
   adjusting a color selected with a first RGB color value for a first pattern ink among a plurality of pattern inks to appear lighter;
   selecting a common geometric pattern for the plurality of pattern inks including the first pattern ink and a second pattern ink among the plurality of pattern inks;
   writing a feature within an object with a second RGB color value;
   writing a geometric pattern opaquely on top of the selected common geometric pattern;
   erasing the feature within the object with a third RGB color value;
   writing the feature with a fourth RGB color value; and
   writing the geometric pattern opaquely on top of the feature in the color adjusted selected for the first pattern ink to create a gloss effect with the geometric pattern opaquely on top of the feature in the color adjusted selected for the first pattern ink which displays the feature.

2. The method of claim 1 further comprising transmitting the gloss effect to a printing system for printing of a watermark on a recording medium with the gloss effect.

3. The method of claim 1 further comprising rendering the gloss effect on a recording medium.

4. The method of claim 3 wherein the recording medium comprises glossy media.

5. The method of claim 3 wherein the recording medium comprises non-glossy media.

6. The method of claim 1 wherein the feature comprises text and the object comprises a textbox.

7. The method of claim 1 wherein the second RGB color value is a lighter version of the first RGB color value, the third RGB color value is near white, and the fourth RGB color value is near yellow.

8. The method of claim 6 wherein the lighter version of the first RGB color value is closer to white.

9. A method for creating a gloss effect, comprising:
   adjusting a color selected for a first pattern ink among a plurality of pattern inks to appear lighter;
   selecting a common geometric pattern for the plurality of pattern inks including the first pattern ink and a second pattern ink among the plurality of pattern inks;
   writing a feature within an object;
   writing a geometric pattern opaquely on top of the selected common geometric pattern; and
   writing the geometric pattern opaquely on top of the feature in the color adjusted selected for the first pattern ink to create a gloss effect with the geometric pattern opaquely on top of the feature in the color adjusted selected for the first pattern ink which displays the feature.

10. The method of claim 9 further comprising erasing the feature within the object after writing the geometric pattern opaquely on top of the selected common geometric pattern.

11. The method of claim 9 wherein:
    adjusting a color selected for a first pattern ink among a plurality of pattern inks to appear lighter, further comprises: adjusting the color selected with a first RGB for the first pattern ink among the plurality of pattern inks to appear lighter; and
    writing a feature within an object, further comprises: writing the feature within the object with a second RGB color value.

12. The method of claim 11 further comprising:
    erasing the feature within the object with a third RGB color value;
    writing the feature with a fourth RGB color value.

13. The method of claim 11 further comprising rendering the gloss effect on a recording medium.

14. A system for rendering a gloss effect, comprising:
    a memory;
    a storage medium for storing data; and
    a processor in communication with the storage medium and the memory, the processor executing machine readable instructions for:
    adjusting a color selected with a first RGB color value for a first pattern ink among a plurality of pattern inks to appear lighter;
    selecting a common geometric pattern for the plurality of pattern inks including the first pattern ink and a second pattern ink among the plurality of pattern inks;
    writing a feature within an object with a second RGB color value;
    writing a geometric pattern opaquely on top of the selected common geometric pattern;
    erasing the feature within the object with a third RGB color value;
    writing the feature with a fourth RGB color value; and
    writing the geometric pattern opaquely on top of the feature in the color adjusted selected for the first pattern ink to create a gloss effect with the geometric pattern opaquely on top of the feature in the color adjusted selected for the first pattern ink which displays the feature.

15. The system of claim 14 wherein the processor further executes machine readable instructions for transmitting the gloss effect to a printing system for printing of a watermark on the recording medium with the gloss effect.

16. The system of claim 15 wherein the second RGB color value is a lighter version of the first RGB color value, the third RGB color value is near white, and the fourth RGB color value is near yellow.

17. The system of claim 14 wherein the processor further executes machine readable instructions for rendering the gloss effect on the recording medium.

18. The system of claim 17 wherein the recording medium comprises glossy media.

19. The system of claim 17 wherein the recording medium comprises non-glossy media.

20. The system of claim 14 wherein the feature comprises text and the object comprises a textbox.

\* \* \* \* \*